United States Patent
Cupples et al.

(10) Patent No.: US 7,140,404 B2
(45) Date of Patent: Nov. 28, 2006

(54) INTEGRAL IN TANK VENT CONSTRUCTION FOR PRESSURE BASED LEVEL MONITORS

(75) Inventors: Kenneth Alan Cupples, Knoxville, TN (US); William Peters Schenk, Jr., Rockford, TN (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 11/199,750

(22) Filed: Aug. 9, 2005

(65) Prior Publication Data

US 2006/0032548 A1    Feb. 16, 2006

Related U.S. Application Data

(60) Provisional application No. 60/600,155, filed on Aug. 10, 2004.

(51) Int. Cl.
*B65B 1/04* (2006.01)

(52) U.S. Cl. .................. 141/95; 141/198; 137/501; 137/315.04

(58) Field of Classification Search ............ 141/94, 141/95, 192, 198; 137/501, 488, 505.13, 137/315.04
See application file for complete search history.

(56) References Cited

U.S. PATENT DOCUMENTS

| 4,522,227 A | * | 6/1985 | Mylander | 137/393 |
| 5,456,280 A | * | 10/1995 | Palmer | 137/501 |
| 5,584,278 A | * | 12/1996 | Satoh et al. | 123/516 |

OTHER PUBLICATIONS

Title: Pressure Sensor Cap Assembly with Connectors, Adapter, Seal Ring and PG7 Th'd Cable Gland; Gems Sensors Inc. Drawing No. 7801092, Jul. 30, 2001, Gems Sensors Inc., One Cowles Road, Plainville, CT USA 06062-1198.

* cited by examiner

*Primary Examiner*—Steven O. Douglas
(74) *Attorney, Agent, or Firm*—Reinhart Boerner Van Deuren P.C.

(57) ABSTRACT

A method and apparatus are provided for monitoring a liquid level in a closed tank with a differential pressure sensor module disposed in a bottom portion of the tank, by routing a pressure reference tube extending from the pressure sensor module through the interior of the tank and attaching an opposite, open, vented end of the pressure reference tube to the tank at a point inside of the tank in an upper portion of the tank.

28 Claims, 4 Drawing Sheets

INTEGRAL IN TANK VENT CONSTRUCTION FOR PRESSURE BASED LEVEL MONITORS

CROSS-REFERENCE TO RELATED PATENT APPLICATIONS

This patent application claims the benefit of U.S. Provisional Patent Application No. 60/600,155, filed Aug. 10, 2004, the teachings and disclosure of which are hereby incorporated in their entireties by reference.

FIELD OF THE INVENTION

This invention relates to monitoring the level of a liquid in a closed tank, and more particularly to monitoring the liquid level in such closed tanks with a pressure-based level monitor.

BACKGROUND OF THE INVENTION

As shown in FIGS. 1 and 2, in one widely used approach to measuring the liquid level 10 in a closed tank 12, a differential pressure monitoring apparatus 14 includes a differential pressure sensor 16 attached by an umbilical cord 18 to a sensor housing 20 including a sealed closure 22 adapted for attachment to an opening, such as a bung-hole 24, located on an upper surface of the tank 12. The umbilical cord 18 has sufficient length to allow the differential pressure sensor 16 to lie on, or be suspended very close to the bottom of the tank 12 when the closure 22 of the monitor 14 is operatively sealing the opening 24 in the tank 12.

As shown in FIG. 1, the differential pressure sensor 16, of such prior monitoring apparatuses 14, have typically been electrical in nature, and have generated electrical signals which are transmitted through one or more electrical transmission elements 26, in the form of wires or metallic strips, which extend through the umbilical cord 18 from the pressure sensor 16 to a termination point on an electric circuit board 28 located within the housing 20 of the pressure monitoring apparatus 14.

A pressure reference tube 30 also extends through the umbilical cord 18 from the pressure sensor 16 to an open-ended termination point located inside of the housing 20. The housing 20 is typically vented to the atmosphere surrounding the housing 20 through a vent 32, which may include internal structures to preclude the entry of fluid into the housing 20, or provide a flame arrester, where volatile fumes or liquids may be involved.

By virtue of this arrangement, ambient air pressure surrounding the housing 20 is communicated through the vent 32 and the open end of the pressure reference tube 30 to the differential pressure sensor 16 located below the liquid level 10 in the tank 12. By sensing changes in differential pressure, the pressure sensor 16 is able to provide an output to the internal circuit 28 indicative of the fluid level 10 in the tank 12. In some instances, the circuitry 28 has included provisions for also determining changes in the level of the liquid 10 in the tank 12 over time, as a function of inputs received from the differential pressure sensor 16.

While such an approach works well in many applications, under certain conditions, and with certain fluids such as propane, it is desirable to have a differential pressure sensor monitor a difference in pressure between an upper, gas-filled portion 34 of the tank 12 and a lower, liquid-filled portion 36 of the tank 12.

BRIEF SUMMARY OF THE INVENTION

The invention provides a method and apparatus for monitoring a liquid level in a closed tank with a differential pressure sensor module disposed in a bottom portion of the tank, by routing a pressure reference tube extending from the pressure sensor module through the interior of the tank and attaching an opposite, open, vented end of the pressure reference tube to the tank at a point inside of the tank in an upper portion of the tank.

In one form of the invention, the pressure reference tube is routed sequentially through lower and upper portions of the interior of a tank, out through a peripheral wall of the tank at a first sealed juncture of the reference tube and the peripheral wall located in the upper portion of the interior of the tank, and then back through the peripheral wall of the tank and into the interior of the tank at a second sealed juncture of the reference tube and the peripheral wall located in the upper portion of the interior of the tank, before terminating in an open vented end thereof at a point in the upper portion of the tank, to thereby provide a differential pressure sensor located in the bottom of the tank with an internal pressure reference located in the upper portion of the tank. The invention may further include providing a sealing closure in the peripheral wall of the tank, and locating both the first and second junctures in the closure. A single liquid-type compression fitting attached to the closure may be utilized for sealing both the first and second junctures.

An apparatus, according to the invention, may also include one or more signal-carrying elements extending from the pressure sensor module through the first juncture. A segment of the pressure reference tube extending between the pressure sensor module in the first juncture, and a segment of the one or more signal-carrying elements extending between the pressure sensor module and the first juncture, may be enclosed in an umbilical cord extending from the pressure sensor module to the first juncture. One or more of the one or more signal-carrying elements and the umbilical cord may be terminated prior to the second juncture.

The vented end of the pressure reference tube may include a filter for resisting entry of fluid into the vented end of the pressure reference tube. A vent protector may be disposed about and extend from the closure beyond the vented end of the pressure reference tube. The vent protector may have an imperforate tubular-shaped wall terminating at an open distal end thereof, with the imperforate wall extending beyond the vented end of the pressure reference tube. By having the vent protector extend beyond the vented end of the tube, the open end of the vent protector will be positioned below the vented end of the pressure reference tube, when the closure is attached to the tank, the vent protector will trap a volume of gas within the tubular-shaped wall of the vent protector, to further preclude entry of fluid into the vented end of the pressure reference tube, in the event that the liquid level in the tank should rise above the level of the open distal end of the vent protector. The imperforate tubular-shaped wall of the vent protector may extend around both the first and second junctures of the pressure reference tube with the closure.

Where a single, fluid-tight compression fitting is utilized to seal either the first and/or second junctures of the pressure reference tube and/or umbilical cord with the peripheral wall of the tank and/or the closure, a seal insert of the compression fitting may include first and second through-holes therein at the first and second junctures respectively.

The invention may also take the form of a method for measuring a differential pressure in a closed tank, utilizing a tank monitor apparatus according to the invention.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
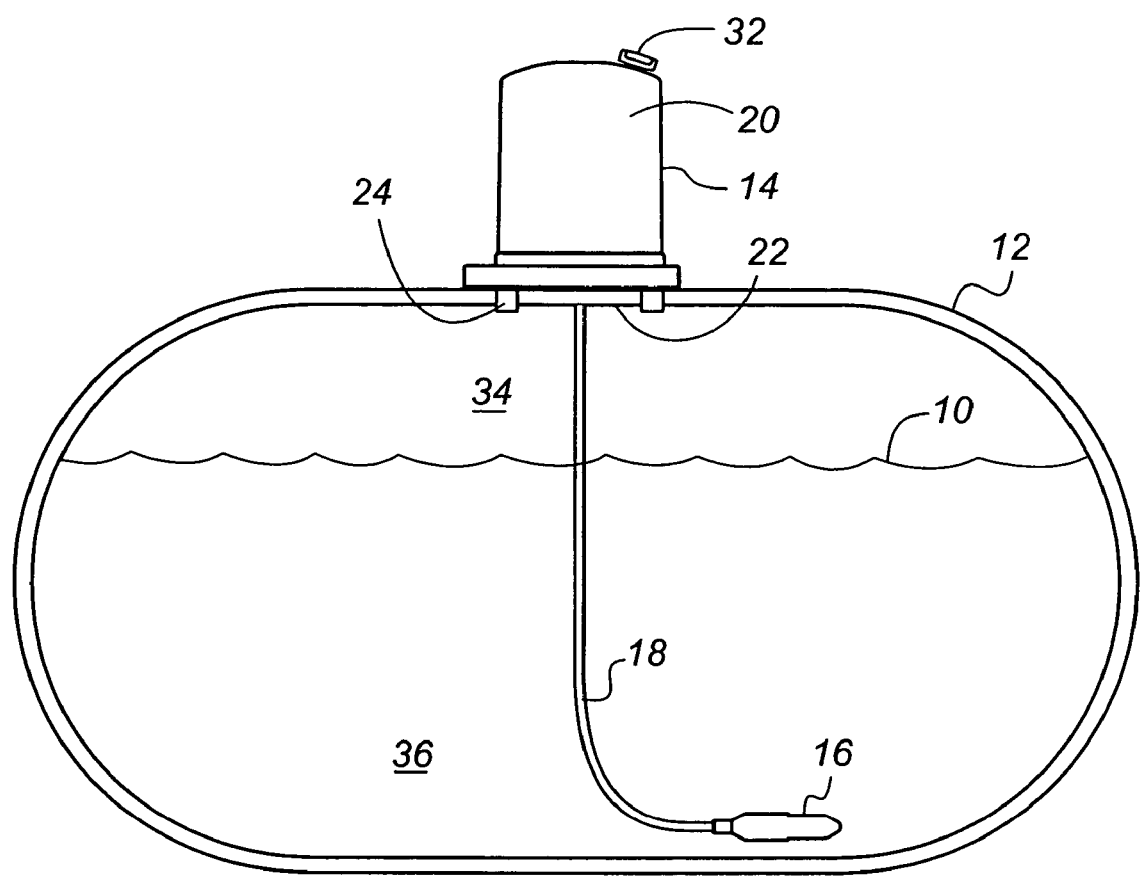
FIG. 1 illustrates a prior, environmentally vented, tank monitoring apparatus mounted on a closed tank containing a liquid.
Figure 2:
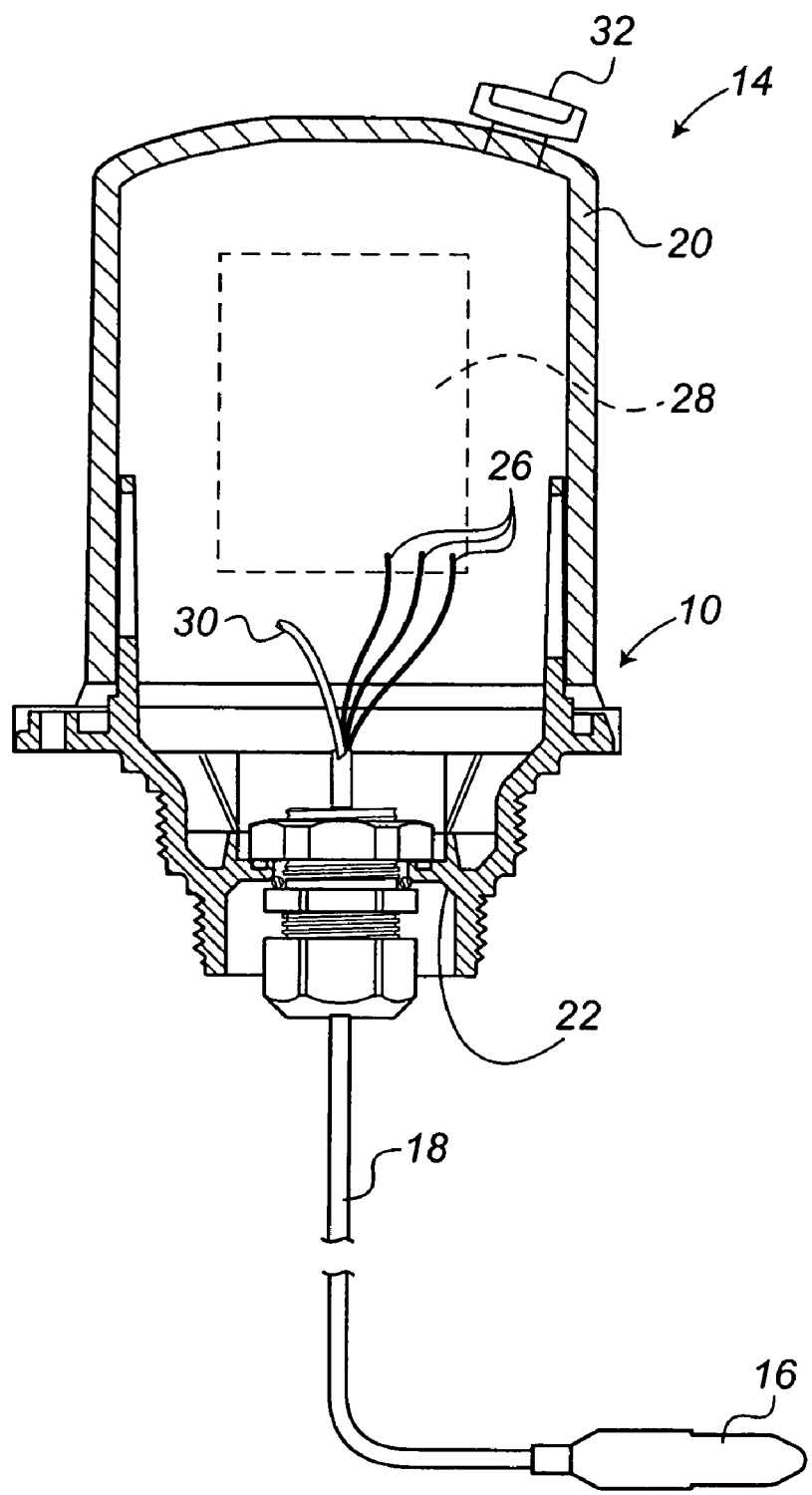
FIG. 2 is an enlarged cross-sectional illustration of the prior tank monitoring apparatus shown in FIG. 1.
Figure 3:
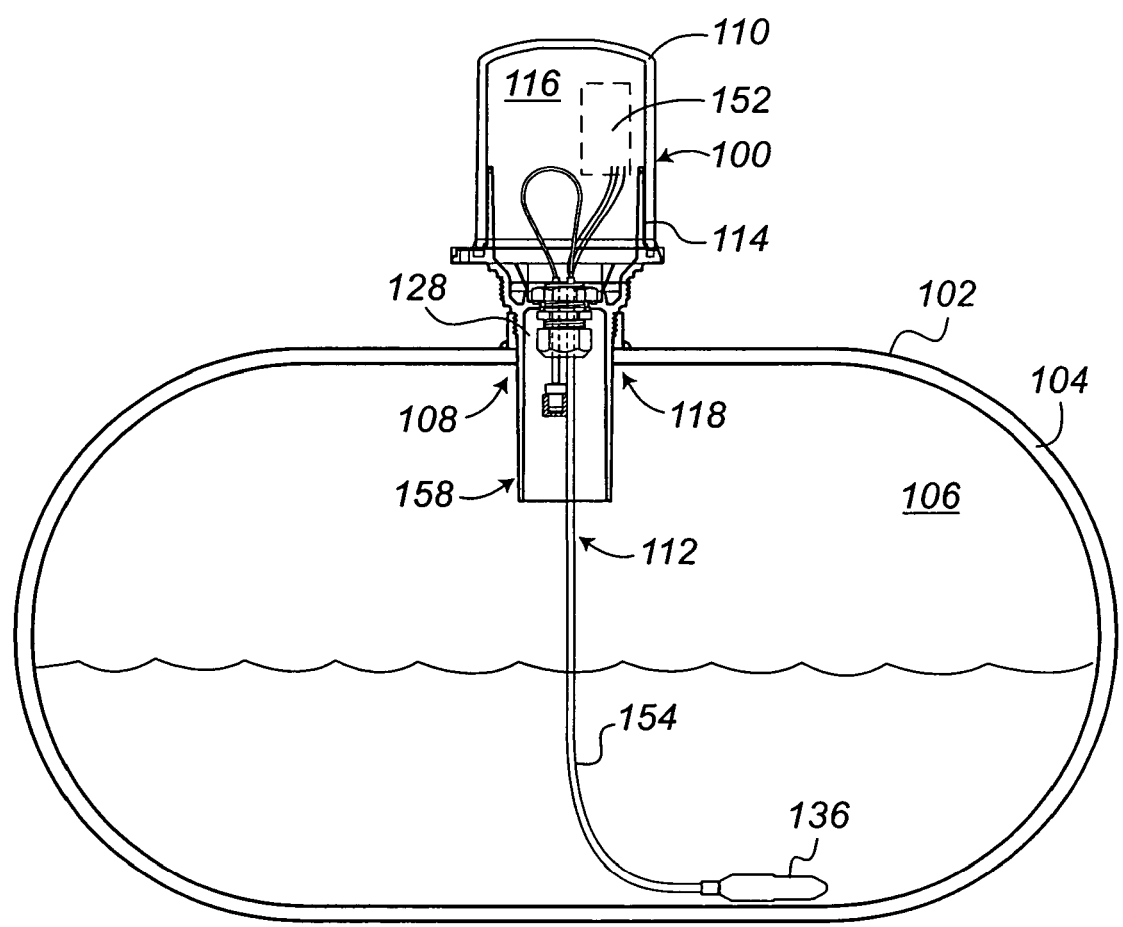
FIG. 3 is an illustration of an exemplary embodiment of a tank monitor apparatus, according to the invention, attached to a closed tank 102.

FIG. 3 illustrates a first exemplary embodiment of a tank monitor apparatus 100, attached to a closed tank 102 having a peripheral wall 104 thereof defining an interior 106 of the tank 102 and a tank opening 108 passing through the peripheral wall 104 of the tank 102. In the exemplary embodiment illustrated in FIG. 3, the tank opening 108 is located at the top of the tank 102, as shown in FIG. 3.

Figure 4:
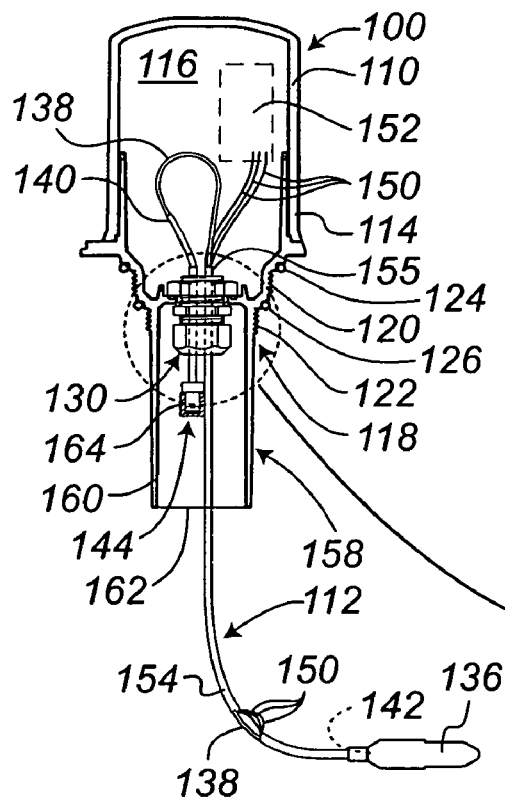
FIG. 4 is an enlarged cross-sectional illustration of the exemplary embodiment of the tank apparatus shown in FIG. 3.

As shown in FIGS. 3 and 4, the exemplary embodiment of the tank monitor apparatus 100 includes a tank monitor housing 110, and a submersible differential pressure sensor 112. The tank monitor housing 110 has a peripheral wall 114 thereof defining a closed interior cavity 116, of the monitor 100, and a sealing closure adapted for sealing engagement with the tank opening 108. As shown in FIG. 4, the sealing closure 118 of the exemplary embodiment includes first and second threaded extensions 120, 122 thereof which are adapted to engage respectively with a 2" diameter, or 1.5" diameter bung-hole-type opening 108 in the tank 102. A large diameter O-ring 124 is utilized to seal the juncture between the closure 118 and the tank bung 108, when the bung-hole has a 2" diameter, and a smaller diameter O-ring 126 is utilized for sealing the juncture between the closure 118 and the tank bung when the bung-hole 108 has a diameter of 1.5".

Figure 5:
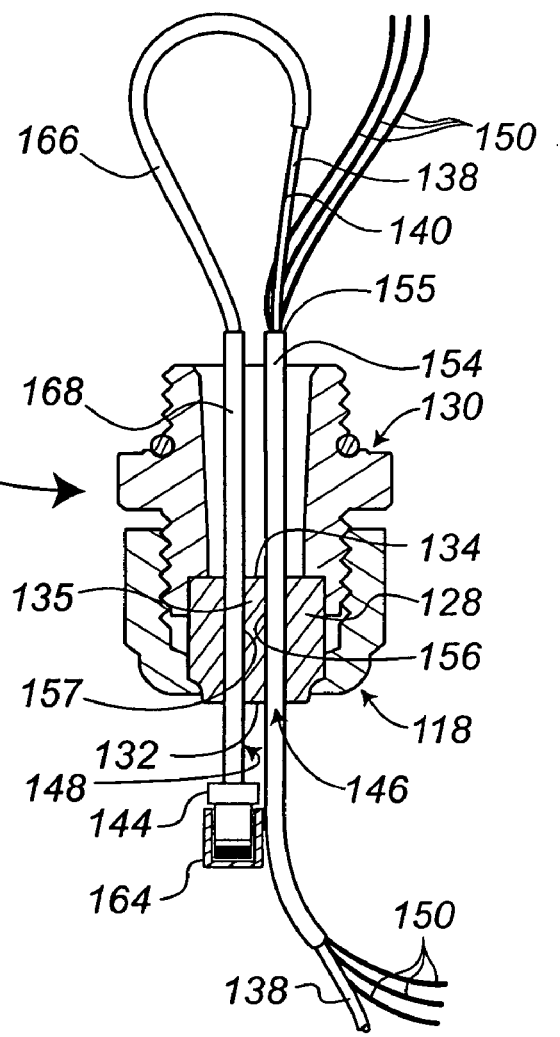
FIG. 5 is an enlarged, partial cross-sectional illustration of a portion of the exemplary embodiment of the tank monitor apparatus shown in FIGS. 3 and 4.

As shown in FIG. 5, the closure 118 of the exemplary embodiment is partially formed by a compressible insert 128 of a liquid-tight compression fitting 130, which is best seen in FIG. 4.

The seal insert 128 has a first surface 132 thereof which forms a portion of a tank-facing surface of the closure 118 and a second surface 134 thereof, defining a portion of a monitor-interior-cavity-facing surface 134 of the sealing closure 118, of the exemplary embodiment. The tank-facing surface 132 serves to partially bound the interior 106 of the tank 102 when the closure 118 is sealing the tank opening 108, and the cavity-facing surface 134 partially bounds the interior cavity 116 of the monitor housing 114. The body of the seal insert 128 extending between the cavity-facing surface 134 and the tank-facing surface 132 forms a portion of a closure wall 135 of the closure 118.

The submersible differential pressure sensor 112 includes a sensor module 136, disposed outside of the interior cavity 116 of the monitor 100, and a pressure reference tube 138 extending from the sensor module 136.

The pressure reference tube 138 has an imperforate wall 140 thereof, extending from a distal end 142 of the reference tube 138 to an opposite, open, vented end 144 of the reference tube 138. As shown in FIG. 4, the distal end 142 of the reference tube 138 is operatively joined to the sensor module 136, and the vented end of the reference tube 144 is fixedly attached to the closure 118 of the monitor housing 114, in a manner described in more detail below, for providing fluid communication between the vented end 144 of the pressure reference tube 138 and the sensor module 136.

As shown in FIGS. 3–5, the pressure reference tube 138 passes sequentially through the compressible seal insert 128 of the closure wall 135 and into the interior cavity 116 of the housing 110 of the monitor 100, at a first juncture 146 of the reference tube 138 and the closure wall 135. The pressure reference tube 138 is then looped back on itself inside of the interior cavity 116 of the monitor 100 and routed back out of the interior cavity 116 through the compressible seal insert 128 of the closure wall 135 at a second juncture 148 of the reference tube 138 and the closure wall 135, with the open, vented end 144 of the reference tube 138 being disposed outside of the closure wall 128 at a point adjacent the second juncture 148 of the reference tube 138 and the closure wall 128.

The exemplary embodiment of the tank monitor apparatus 100 further includes a plurality of signal carrying elements 150, operatively extending from the sensor module 136 and through the closure 118 to points of termination on a circuit board 152 located within the interior cavity of the tank monitor 100.

An umbilical cord 154 is disposed about the signal carrying elements 150 and the pressure reference tube 138, between the sensor module 136 and the first juncture 146 of the closure 118. One end of the umbilical cord is sealed to the pressure module 136, and the opposite end of the umbilical cord is sealed to the closure 118 by virtue of passing through a first through-hole 156 in the compressible seal insert 128 of the liquid-tight compression fitting 130. As illustrated in FIGS. 3–5, the second end 155 of the umbilical cord 154 is terminated inside of the housing 110, prior to the umbilical cord 154 reaching the second juncture 148 of the reference tube 138 and the closure wall 128.

As will be understood from the illustrations, by those having skill in the art, the liquid-tight compression fitting 130 of the exemplary embodiment is of the type of liquid-tight fittings having a multi-hole seal insert supplied by various manufactures in the industry according to NEMA for x IP 65. It will be further understood, however, that in other embodiments of the invention, the sealed joints at the first and second junctures may be formed by other types of fittings, or in other ways, such as through the use of potting compounds. It is preferable, however, to utilize compression fittings meeting applicable government regulations, to reduce the need for qualification testing to show compliance of the sealing means or method with applicable government standards.

As shown in FIGS. 3 and 4, the exemplary embodiment of the tank monitor apparatus 100 also includes a vent protector 158, which extends into the interior 106 of the tank 102 from the tank-facing surface 132 of the closure 118 when then exemplary embodiment of the tank monitor apparatus 100 is attached to the tank opening 108 with the umbilical cord 154 and sensor module 136 extending through the tank opening 128 into the interior 106 of the tank 102.

As shown in FIG. 4, the vent protector 158 includes an imperforate tubular-shaped wall 160 having a first end formed integrally with or attached to the closure 118. The imperforate annular wall 160 of the vent protector, in the exemplary embodiment, is disposed about both the umbilical cord 154 and the vented end 144 of the reference tube 138, and terminates at an open, distal end 162 of the imperforate wall 160 located farther from the closure 118 than the vented end 144 of the reference tube 138.

A filter 164 at the vented end 144 of the reference tube 138 includes an element of PTFE, or another suitable material, for precluding entry of fluid into the vented end 144 of the reference tube 138.

As will be understood by those having skill in the art, having the distal end 162 of the vent protector 158 extend beyond the filter 164 further helps to preclude entry of fluid into the vented end 144 of the reference tube 138, by trapping a volume of gas within the vent protector 158, in the event that the liquid level in the tank should rise above the distal end 162 of the vent protector 158. The vent protector 158 also serves to protect the filter 144, the vented end 144 of the reference tube 138 and the umbilical cord 154 from physical damage, in the area adjacent the first and second junctures 146, 148, while the monitor 100 is separate from, or being attached to or removed from the tank 102.

In the exemplary embodiment of the tank monitor 100, the portion of the pressure reference tube 138 attached to the pressure sensor 136 is made from a PTFE material, which tends to be fairly stiff, and not readily bendable. In order to make the substantially U-shaped turn inside of the interior cavity 116 of the housing 114, and to allow the first and second through-holes 156, 157 in the seal insert to be of the same size, the pressure reference tube 138 of the exemplary embodiment 100 includes an intermediate tube section 166 and an end section 168 of a material, such as FEP, that is more flexible than PTFE. The inner diameter of the intermediate tube section 166 is closely matched to an outer diameter of the PTFE portion of the reference tube 138 extending from the sensor 136, so that a fluid-tight compression fit is achieved when the PTFE portion is inserted into the intermediate tube section 166. In similar fashion, the end section 168 has an inner diameter closely matching the outer diameter of the intermediate section, to achieve a liquid-tight, press fitted joint between the intermediate and end sections 166, 168. The outer diameter of the end section 168 of the pressure reference tube 138 is selected to closely match the outer diameter of the umbilical cord 154, so that the first and second through-holes 156, 157 in the seal insert 128 can be the same diameter.

Those having skill in the art will readily recognize that, in other embodiments of the invention, the configuration and attachment of the vented end of the pressure reference tube can be accomplished in a wide variety of ways, in accordance with the invention. For example, a pipe fitting of metallic or non-metallic material may be utilized to form a U-shaped bend in the pressure reference tube. The pressure reference tube may be made from a material that is more flexible than PTFE, so that the intermediate and end sections of the pressure reference tube 138 of the exemplary embodiment may be eliminated. The vented end of a pressure reference tube, according to the invention, may be attached directly, or to fitting on, the tank-facing surface of the closure. The vented end of a pressure reference tube, according to the invention, may alternatively be attached directly, or to fitting on, the an inside surface of a tank in the upper portion of the tank. Many other arrangements are also possible and/or contemplated, within the scope of the invention.

The filter 164, in the exemplary embodiment, is a modified, standard, brass fitting, of the type having a compressible metal ferrule for joining two lengths of plastic tubing, or for joining a length of metal tubing to a length of plastic tubing. The fitting body has a barbed end, which is inserted into the vented end 144 of the end section 168 of the pressure reference tube 138. The ferrule is removed from the fitting, and discarded, and replaced with a filter membrane of a material that is water, oil and chemical resistant material, such the ePTFE material sold under the trade name GORE™ Membrane Vents, W. L. Gore 7 Associates, or another appropriate material. Those having skill in the art will recognize, however, that, in alternate embodiments of the invention, a filter 164 may be have many other configurations, and utilize other appropriate materials.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tank monitor apparatus, for a closed tank having a peripheral wall thereof defining an interior of the tank and a tank opening passing through the peripheral wall, the tank monitor apparatus comprising:
    a sealing closure for the tank opening having an interior surface thereof for partially bounding the interior of the tank when the closure is sealing the tank opening; and
    a submersible differential pressure sensor including a sensor module and a pressure reference tube;
    the pressure reference tube having a distal end thereof operatively joined to the sensor module, and also having an opposite vented end thereof attached to the sealing closure adjacent the interior surface of the sealing enclosure in such a manner that the vented end of the pressure reference tube provides operative, sealed fluid communication between the sensor module and the interior of the tank adjacent the interior surface of the sealing closure, when the sealing closure is installed in the tank with the submersible differential pressure sensor extending into the interior of the tank.

2. The tank monitor apparatus of claim 1, further including a filter operatively connected to the vented end of the pressure reference tube.

3. The tank monitor of claim 1, further including a vent protector extending from the interior surface of the closure about the vented end of the pressure reference tube.

4. The tank monitor apparatus of claim 1, further comprising:
    at least one signal carrying element operatively extending from the sensor module and through the closure; and
    an umbilical cord disposed about the signal carrying element and the pressure reference tube, and sealingly extending between the sensor module and the closure.

5. The tank monitor apparatus of claim 4, wherein a juncture of the umbilical cord and the closure is sealed with a liquid-tight compression fitting.

6. The tank monitor apparatus of claim 1, wherein:
    the sealing closure includes a closure wall defining and separating the interior surface of the closure from an outer surface thereof; and
    the pressure reference tube, extending from the sensor module, passes first outward through the closure wall, sequentially through the interior and the outer surfaces closure, at a first juncture of the reference tube and closure wall, and then back inward through the closure wall, sequentially through the outer and interior surfaces of the closure, before terminating at the vented end of the pressure reference tube.

7. The tank monitor apparatus of claim 6, wherein at least one of the first and second junctures is sealed with a liquid-tight compression fitting comprising, having a body, a compression cap, and seal insert;
    the seal insert having a through-hole therein adapted for passage therethrough of the pressure reference tube and applying a compressive force to the pressure reference tube when a compressive force is applied to the seal insert;
    the body having a stem portion thereof attached to the closure, and defining a through-bore therein for passage of the pressure reference tube therethrough, a section of the through-bore being configured as a seal insert cavity for receiving and retention therein of the seal insert;
    the body and compression cap being adapted for fixed attachment to one another in a manner applying compressive force to the seal insert, to thereby cause the seal insert to apply a corresponding compressive force to the pressure reference tube for retaining the pressure reference tube and forming a fluid-tight seal between the pressure reference tube and the housing.

8. The tank monitor apparatus of claim 7, wherein the body and compression cap form a threaded connection with one another for applying a compressive force to the reference tube, as the first and second elements are threaded together, to thereby retain the reference tube in the compression fitting and form the fluid tight seal.

9. The tank monitor apparatus of claim 7, wherein the seal insert includes first and second through-holes therein for passage therethrough of the pressure reference tube at the first and second junctures respectively, and wherein the seal insert applies compressive force to the pressure reference tube at each of the first and second junctures, when the body and compression cap are attached fixedly to one another, to thereby retain the reference tube in the compression fitting and form a fluid tight seal at both the first and second junctures.

10. The tank monitor apparatus of claim 9, wherein the body and compression cap form a threaded connection with one another for applying a compressive force to the reference tube, at both the first and second junctures, as the first and second elements are threaded together, to thereby retain the reference tube in the compression fitting and form a fluid tight seal at both the first and second junctures.

11. The tank monitor apparatus of claim 7, further comprising:
    at least one signal carrying element operatively extending from the sensor module and through the closure; and
    an umbilical cord disposed about the signal carrying element and the pressure reference tube, and sealingly extending between the sensor module and the closure.

12. The tank monitor apparatus of claim 11, wherein the seal insert includes first and second through-holes therein at the first and second junctures respectively, the umbilical tube, with the reference tube and one or more signal carrying elements enclosed therein, passing through the first through-hole and only the reference tube passing through the second through-hole, and wherein the seal insert applies compressive force to the umbilical cord and the pressure reference tube respectively at the first and second junctures, when the body and compression cap are attached fixedly to one another, to thereby retain the umbilical cord and the reference tube in the compression fitting and form a fluid tight seal at both the first and second junctures.

13. The tank monitor apparatus of claim 12, wherein the body and compression cap form a threaded connection with one another for applying a compressive force to the umbilical cord and the reference tube respectively, at the first and second junctures, as the first and second elements are threaded together, to thereby retain the umbilical cord and the reference tube in the compression fitting and form a fluid tight seal at both the first and second junctures.

14. The tank monitor apparatus of claim 12, further including a filter operatively connected to the vented end of the pressure reference tube.

15. The tank monitor of claim 12, further including a vent protector extending from the interior surface of the closure about the vented end of the pressure reference tube.

16. The tank monitor of claim 15, wherein the vent protector comprises an imperforate tubular-shaped wall defining an open distal end thereof.

17. A tank monitor apparatus, for a closed tank having a peripheral wall thereof defining an interior of the tank and a tank opening passing through the peripheral wall, the tank monitor apparatus comprising:
   a tank monitor housing, and a submersible differential pressure sensor;
   the tank monitor housing having a peripheral wall thereof defining a closed interior cavity of the monitor and a sealing closure for the tank opening, with the closure including a closure wall defining and separating a tank-facing surface thereof from a monitor-interior-cavity-facing surface thereof, with the tank-facing surface configured for partially bounding the interior of the tank when the closure is sealing the tank opening, and the cavity-facing surface partially bounding the interior cavity of the monitor;
   the submersible differential pressure sensor including a sensor module disposed outside of the interior cavity of the monitor and a pressure reference tube extending from the sensor module;
   the pressure reference tube having an imperforate wall thereof extending from a distal end to an opposite, open, vented end of the reference tube, with the distal end of the reference tube being operatively joined to the sensor module and the vented end thereof being fixedly attached to the closure of the monitor housing, for providing fluid communication between the vented end of the pressure reference tube and the sensor module;
   the pressure reference tube passing sequentially through the closure wall and into the interior cavity of the monitor, at a first juncture of the reference tube and the closure wall, and then passing back out of the interior cavity of the monitor through the closure wall, at a second juncture of the pressure reference tube and the closure wall, with the open, vented end of the reference tube being disposed outside of the closure wall adjacent the second juncture of the reference tube and the closure wall.

18. The tank monitor apparatus of claim 17, further comprising:
   at least one signal carrying element operatively extending from the sensor module and through the closure; and
   an umbilical cord disposed about the signal carrying element and the pressure reference tube, and sealingly extending between the sensor module and the first juncture of the closure;
   the at least one signal carrying element terminating within the interior cavity of the tank monitor;
   the umbilical cord terminating prior to the second juncture of the reference tube and the closure wall.

19. The tank monitor of claim 18, further including a vent protector extending from the tank-facing surface of the closure about the first and second junctures and the vented end of the pressure reference tube.

20. The tank monitor of claim 15, wherein the vent protector comprises an imperforate tubular-shaped wall terminating in an open distal end thereof, with the imperforate wall extending beyond the vented end of the pressure reference tube.

21. The tank monitor apparatus of claim 20, further including a filter operatively connected to the vented end of the pressure reference tube.

22. The tank monitor apparatus of claim 4, wherein first and second junctures are sealed with a single liquid-tight compression fitting.

23. The tank monitor of claim 22, wherein the interior cavity of the monitor is not vented.

24. A method for measuring a differential pressure in a closed tank having a peripheral wall thereof defining an interior of the tank including an upper and a lower portion of the interior, the method comprising, operatively connecting one end of an imperforate pressure reference tube to a differential pressure sensor module located in the lower portion of the tank, routing the pressure tube, sequentially, through the lower and upper portions of the interior of the tank, out through the peripheral wall of the tank at a first sealed juncture of the reference tube and the peripheral wall located in the upper portion of the interior, and then back through the peripheral wall of the tank and into the interior of the tank at a second sealed juncture of the reference tube and the peripheral wall located in the upper portion of the interior, before terminating the pressure reference tube at an open vented end thereof, to thereby provide the differential pressure sensor in the bottom of the tank with an internal pressure reference in the upper portion of the tank.

25. The method of claim 24, further comprising:
   sealingly enclosing a segment of the pressure reference tube extending between the pressure sensor module and the first juncture, and one or more signal carrying elements extending between the pressure sensor module and the first juncture, in an umbilical cord extending from the pressure sensor module to the first juncture; and
   terminating the one or more signal carrying elements and umbilical cord prior to the second juncture.

26. The method of claim 25, further comprising, providing a sealing closure in the peripheral wall of the tank, and locating both the first and second junctures in the closure.

27. The method of claim 26, further comprising sealing both the first and second junctures with a single liquid-tight compression fitting attached to the closure.

28. The method of claim 26, further comprising, providing a vent protector extending into the interior of the tank from the closure about the first and second junctures and the vented end of the pressure reference tube, with the vent protector having an imperforate tubular-shaped wall terminating in an open distal end thereof, with the imperforate wall extending beyond the vented end of the pressure reference tube.

* * * * *